(12) United States Patent
Sato et al.

(10) Patent No.: US 12,085,197 B2
(45) Date of Patent: Sep. 10, 2024

(54) HYDROGEN-FILLING HOSE

(71) Applicant: The Yokohama Rubber Co., Ltd., Tokyo (JP)

(72) Inventors: Shun Sato, Kanagawa (JP); Daisuke Maeda, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 18/252,433

(22) PCT Filed: Oct. 7, 2021

(86) PCT No.: PCT/JP2021/037223
§ 371 (c)(1),
(2) Date: May 10, 2023

(87) PCT Pub. No.: WO2022/107481
PCT Pub. Date: May 27, 2022

(65) Prior Publication Data
US 2023/0313916 A1 Oct. 5, 2023

(30) Foreign Application Priority Data

Nov. 17, 2020 (JP) ................................. 2020-190980

(51) Int. Cl.
*F16L 11/08* (2006.01)
*B32B 1/08* (2006.01)
(Continued)

(52) U.S. Cl.
CPC .............. *F16L 11/086* (2013.01); *B32B 1/08* (2013.01); *B32B 15/02* (2013.01); *B32B 15/06* (2013.01);
(Continued)

(58) Field of Classification Search
CPC .......... F16L 11/086; C08L 77/00; B32B 1/08; B32B 15/02; B32B 15/06; B32B 15/088; B32B 15/18; B32B 2597/00
See application file for complete search history.

(56) References Cited

U.S. PATENT DOCUMENTS

2005/0067035 A1* 3/2005 Suzuki .................... F16L 11/04
138/140
2019/0375182 A1 12/2019 Kanesugi et al.

FOREIGN PATENT DOCUMENTS

| JP | 2009-236258 A | 10/2009 |
| JP | 2018-066445 A | 4/2018 |
| WO | WO 2018/155491 A1 | 8/2018 |

OTHER PUBLICATIONS

English machine translation for JP2009-236258A. (Year: 2009).*

* cited by examiner

*Primary Examiner* — Michael C Miggins
(74) *Attorney, Agent, or Firm* — Thorpe North & Western

(57) ABSTRACT

Provided is a hydrogen-filling hose including an inner layer, a reinforcing layer, and an outer layer, the hydrogen-filling hose being characterized in that the inner layer includes a thermoplastic resin composition including a matrix that includes a polyamide resin and a domain that includes a modified styrene elastomer, the modified styrene elastomer content of the thermoplastic resin composition is 5-50 mass % of all polymer components in the thermoplastic resin composition, the reinforcing layer includes at least one layer that includes steel wire, and the outer layer includes a thermoplastic elastomer.

12 Claims, 1 Drawing Sheet

(51) Int. Cl.
 *B32B 15/02* (2006.01)
 *B32B 15/06* (2006.01)
 *B32B 15/088* (2006.01)
 *B32B 15/18* (2006.01)
 *C08L 77/00* (2006.01)
(52) U.S. Cl.
 CPC ............ *B32B 15/088* (2013.01); *B32B 15/18* (2013.01); *C08L 77/00* (2013.01); *B32B 2597/00* (2013.01)

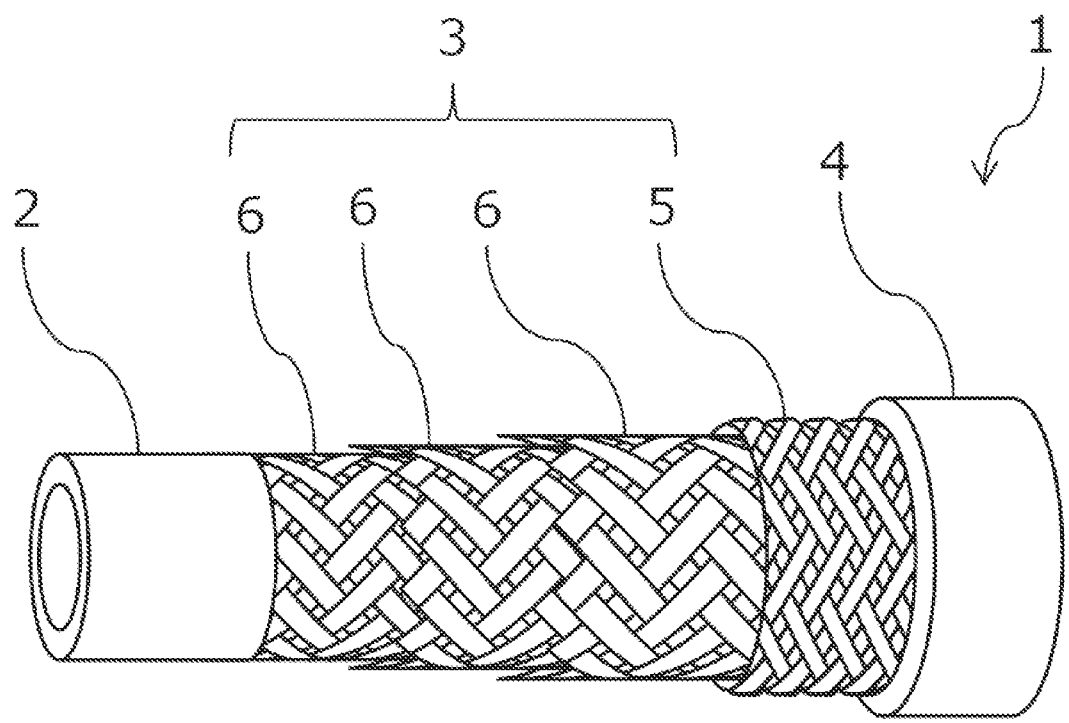

HYDROGEN-FILLING HOSE

FIELD

The present technology relates to a hydrogen-filling hose. More particularly, the present technology relates to a hose through which hydrogen gas is filled into a fuel cell vehicle or the like from a dispenser installed at a hydrogen station.

BACKGROUND

In recent years, fuel cell vehicles and the like have been actively developed. In association with this, the development of a hose used for filling hydrogen gas into a fuel cell vehicle or the like from a dispenser installed at a hydrogen station has been advanced as well. Such a hydrogen-filling hose is required to have hydrogen gas barrier properties and be, for example, flexible and durable in a low-temperature environment.

As a hydrogen transport hose which has excellent hydrogen gas barrier properties and can be provided with an improved flexibility in a low-temperature environment and thus an improved durability in a low-temperature environment, International Patent Publication No. WO 2018/155491 discloses a hydrogen transport hose which includes an inner layer formed of a resin composition containing polyamide 11 and a modified olefin-based elastomer, a reinforcing layer, and an outer layer containing a polyamide resin.

Conventionally, the pressure of hydrogen to be filled is 82 MPa; however, in recent years, as this pressure is increased to, for example, 87.5 MPa, there is an increasing demand for durability of a hydrogen-filling hose in repeated filling.

SUMMARY

The present technology provides a hydrogen-filling hose which has excellent durability in repeated filling of high-pressure hydrogen.

The present technology is a hydrogen-filling hose, comprising an inner layer, a reinforcing layer, and an outer layer, wherein the inner layer comprises a thermoplastic resin composition that comprises a matrix comprising a polyamide resin and a domain comprising a modified styrene-based elastomer, the content of the modified styrene-based elastomer in the thermoplastic resin composition is 5 to 50% by weight of all polymer components in the thermoplastic resin composition, the reinforcing layer comprises at least one layer comprising steel wires, and the outer layer comprises a thermoplastic elastomer.

The present technology encompasses the following embodiments.

[1] A hydrogen-filling hose, comprising an inner layer, a reinforcing layer, and an outer layer,
wherein
the inner layer comprises a thermoplastic resin composition that contains a matrix comprising a polyamide resin and a domain comprising a modified styrene-based elastomer,
the content of the modified styrene-based elastomer in the thermoplastic resin composition is 5 to 50% by weight of all polymer components in the thermoplastic resin composition, the reinforcing layer comprises at least one layer comprising steel wires, and the outer layer comprises a thermoplastic elastomer.

[2] The hydrogen-filling hose according to [1], wherein the modified styrene-based elastomer is an acid-modified, amine-modified, or epoxy-modified styrene-butadiene-styrene block copolymer (SBS), styrene-ethylene-butylene-styrene block copolymer (SEBS), styrene-isoprene-styrene block copolymer (SIS), styrene-ethylene-propylene block copolymer (SEP), or styrene-ethylene-propylene-styrene block copolymer (SEPS).

[3] The hydrogen-filling hose according to [1] or [2], wherein the polyamide resin is polyamide 11, polyamide 12, polyamide 6/66 copolymer, polyamide 610, polyamide 6/12 copolymer, polyamide 1010, or polyamide 1012.

[4] The hydrogen-filling hose according to any one of [1] to [3], wherein a ratio $V/V_0$ of a volume V, which is a volume of the thermoplastic resin composition measured after the thermoplastic resin composition is exposed to a hydrogen atmosphere having a temperature of 30° C. and a pressure of 90 MPa for 24 hours and subsequently the pressure is reduced to the atmospheric pressure, to a volume $V_0$, which is a volume of the thermoplastic resin composition measured prior to the exposure, is lower than 1.08.

[5] The hydrogen-filling hose according to any one of [1] to [4], wherein the amount of dissolved hydrogen is 3,000 ppm by weight or less after the 24-hour exposure of the thermoplastic resin composition to a hydrogen atmosphere having a temperature of 30° C. and a pressure of 90 MPa.

[6] The hydrogen-filling hose according to any one of [1] to [5], wherein, when strain is repeatedly applied to the thermoplastic resin composition at a temperature of −35° C., an amplitude of 13.5%, and a frequency of 1.7 Hz, the number of cycles at break is not less than 2,000,000.

[7] The hydrogen-filling hose according to any one of [1] to [6], wherein the thermoplastic resin composition has a hydrogen permeability coefficient of $12 \times 10^{-10}$ cc·cm/(cm$^2$·s·cmHg) or less.

[8] The hydrogen-filling hose according to any one of [1] to [7], wherein the reinforcing layer comprises a layer comprising poly(p-phenylene benzobisoxazole) fibers.

[9] The hydrogen-filling hose according to any one of [1] to [8], wherein the thermoplastic elastomer is an elastomer comprising at least one of an ester bond, an amide bond, or a urethane bond.

The hydrogen-filling hose according to the present technology has excellent durability in repeated filling of high-pressure hydrogen.

BRIEF DESCRIPTION OF THE DRAWING

The Drawing is a partially broken perspective view of the hydrogen-filling hose according to the present technology.

DETAILED DESCRIPTION

The present technology is a hydrogen-filling hose, comprising an inner layer, a reinforcing layer, and an outer layer, wherein the inner layer comprises a thermoplastic resin composition that comprises a matrix comprising a polyamide resin and a domain comprising a modified styrene-based elastomer, the content of the modified styrene-based elastomer in the thermoplastic resin composition is 5 to 50% by weight of all polymer components in the thermoplastic resin composition, the reinforcing layer comprises at least one layer comprising steel wires, and the outer layer comprises a thermoplastic elastomer.

FIG. 1 is a perspective view of the hydrogen-filling hose according to the present technology, which is partially cut-opened to clearly illustrate a layer configuration. It is noted here, however, that the present technology is not limited to the illustrated configuration.

A hydrogen-filling hose 1 includes an inner layer 2, a reinforcing layer 3, and an outer layer 4. The reinforcing layer 3 comprises a layer 5 comprising steel wires. The reinforcing layer 3 of the hydrogen-filling hose illustrated in FIG. 1 further comprises three layers 6 comprising poly(p-phenylene benzobisoxazole) fibers. It is noted here, however, that these layers comprising poly(p-phenylene benzobisoxazole) fibers are not essential.

The hydrogen-filling hose is a hose used for filling hydrogen from a tank, a cylinder, or the like to other tank, cylinder or the like, preferably a hose through which hydrogen gas is filled into a fuel cell vehicle or the like from a dispenser installed at a hydrogen station.

The inner layer comprises a thermoplastic resin composition. The thermoplastic resin composition constituting the inner layer comprises a matrix and a domain. In other words, the thermoplastic resin composition has a sea-island structure. The matrix comprises a polyamide resin, and the domain comprises a modified styrene-based elastomer. By constituting the inner layer with such a thermoplastic resin composition that comprises a matrix comprising a polyamide resin and a domain comprising a modified styrene-based elastomer, a change in the volume of the composition can be reduced when the inner layer is exposed to a high pressure in a hydrogen atmosphere and the pressure is subsequently reduced. In addition, since the thermoplastic resin composition is more likely to be finely dispersed than a thermoplastic elastomer, it provides a high modification effect and excellent low-temperature fatigue resistance.

The polyamide resin preferably includes, but is not limited to, polyamide 11, polyamide 12, polyamide 6/66 copolymer, polyamide 610, polyamide 6/12 copolymer, polyamide 1010, and polyamide 1012. Thereamong, polyamide 11, polyamide 12, polyamide 1010, and polyamide 1012 are preferred since they exhibit a small dimensional change with moisture absorption.

The modified styrene-based elastomer preferably includes, but is also not limited to, acid-modified, amine-modified, or epoxy-modified styrene-butadiene-styrene block copolymers (SBS), styrene-ethylene-butylene-styrene block copolymers (SEBS), styrene-isoprene-styrene block copolymers (SIS), styrene-ethylene-propylene block copolymers (SEP), and styrene-ethylene-propylene-styrene block copolymers (SEPS). Thereamong, from the standpoint of cyclic fatigue resistance at low temperature, acid-modified, amine-modified, or epoxy-modified styrene-butadiene-styrene block copolymers (SBS) and styrene-ethylene-butylene-styrene block copolymers (SEBS) are preferred.

Especially, from the standpoint of dispersibility in the polyamide resin, an acid-modified styrene-based elastomer is preferred, and a maleic anhydride-modified styrene-butadiene-styrene block copolymer (SBS) or styrene-ethylene-butylene-styrene block copolymer (SEBS) is particularly preferred.

The content of the modified styrene-based elastomer in the thermoplastic resin composition is preferably 5 to 50% by weight, more preferably 8 to 48% by weight, still more preferably 12 to 46% by weight, of all polymer components in the thermoplastic resin composition. When the content of the modified styrene-based elastomer is excessively low, the inner layer is likely to be broken by repeated deformation associated with hydrogen filling, while when the content is excessively high, leakage of hydrogen to the outside of the hose is increased due to poor gas barrier properties.

The ratio $V/V_0$ of a volume V to a volume $V_0$ is preferably lower than 1.08, more preferably 1.00 to 1.07, still more preferably 1.00 to 1.06, wherein the volume V is a volume of the thermoplastic resin composition measured after the thermoplastic resin composition is exposed to a hydrogen atmosphere having a temperature of 30° C. and a pressure of 90 MPa for 24 hours and subsequently the pressure is reduced to the atmospheric pressure, and the volume $V_0$ is a volume of the thermoplastic resin composition measured prior to the exposure. When the ratio $V/V_0$ is in this range, the dimensional change of the inner layer at the time of pressure reduction during hydrogen filling is small, so that the generation of an origin of breakage caused by encroachment of the inner layer into the reinforcing layer can be inhibited.

The amount of dissolved hydrogen after 24-hour exposure of the thermoplastic resin composition to a hydrogen atmosphere having a temperature of 30° C. and a pressure of 90 MPa is preferably 3,000 ppm by weight or less, more preferably 2,800 ppm by weight or less, still more preferably 2,600 ppm by weight or less. When the amount of dissolved hydrogen is in this range, the amount of hydrogen retained in the inner layer during hydrogen filling is small, so that breakage caused by hydrogen expansion inside the inner layer at the time of pressure reduction can be inhibited.

When strain is repeatedly applied to the thermoplastic resin composition at a temperature of −35° C., an amplitude of 13.5%, and a frequency of 1.7 Hz, the number of cycles at break is preferably not less than 2,000,000, more preferably not less than 3,000,000, still more preferably not less than 5,000,000. When the number of cycles at break is in this range, the inner layer is unlikely to be broken by repeated deformation associated with hydrogen filling.

The hydrogen permeability coefficient of the thermoplastic resin composition is preferably $12 \times 10^{-10}$ cc·cm/(cm$^2$·s·cmHg) or less, more preferably $10 \times 10$ cc·cm/(cm$^2$·s·cmHg) or less, still more preferably $8 \times 10^{-10}$ cc·cm/(cm$^2$·s·cmHg) or less. By controlling the hydrogen permeability coefficient to be in this range, leakage of hydrogen to the outside of the hose during hydrogen filling can be inhibited.

The thermoplastic resin composition may also comprise components other than the polyamide resin and the modified styrene-based elastomer within a range that does not hinder the effects of the present technology.

The thickness of the inner layer is preferably 0.2 to 2.0 mm, more preferably 0.3 to 1.8 mm, still more preferably 0.4 to 1.6 mm. An excessively thin inner layer can make it difficult to perform melt extrusion and limit an extrusion method, while an excessively thick inner layer can lead to insufficient flexibility and poor ease of handling of the hose.

The reinforcing layer is a layer arranged between the inner layer and the outer layer, and it is usually composed of a braided or spiral layer that is formed by braiding metal wires or chemical fibers. Examples of the metal wires include steel wires, wires of copper and copper alloys, wires of aluminum and aluminum alloys, wires of magnesium alloys, and wires of titanium and titanium alloys, among which steel wires are preferred. The diameter of the metal wires is preferably 0.25 to 0.40 mm Examples of the chemical fibers include poly(p-phenylene benzobisoxazole) (PBO) fibers, aramid fibers, and carbon fibers, among which PBO fibers are preferred. The diameter of the chemical fibers is preferably 0.25 to 0.30 mm.

In the present technology, the reinforcing layer comprises at least one layer comprising steel wires. By incorporating at least one layer comprising steel wires, deformation of the hose caused by an internal pressure during hydrogen filling is reduced, so that deformation of the inner layer can be inhibited. The reinforcing layer preferably further comprises a layer comprising PBO fibers. The layer comprising PBO fibers may be arranged in a plural number as well. When the reinforcing layer comprises both a layer comprising steel wires and a layer comprising PBO fibers, the layer comprising steel wires is arranged on the outer side than the layer comprising PBO fibers. By arranging the layer comprising steel wires on the outer side than the layer comprising PBO fibers, the flexibility and the durability of the hose are likely to be ensured. The reinforcing layer more preferably has a four-layer structure which comprises one layer comprising steel wires and, on the inside thereof, three layers comprising PBO fibers, or a four-layer structure which comprises four layers comprising steel wires.

The outer layer comprises a thermoplastic elastomer. By incorporating a thermoplastic elastomer into the outer layer, a trace amount of hydrogen permeating from the inside during hydrogen filling is allowed to immediately permeate to the outside of the hose, so that hydrogen embrittlement of the steel wires constituting the reinforcing layer is likely to be inhibited.

The thermoplastic elastomer preferably has a glass transition temperature of 0° C. or lower. By having a glass transition temperature of 0° C. or lower, the thermoplastic elastomer stays soft under the service temperature environment of the hose; therefore, the thermoplastic elastomer makes the hose more flexible.

The thermoplastic elastomer is preferably, but not limited to, for example, an elastomer containing at least one of an ester bond, an amide bond, or a urethane bond. Examples of an elastomer containing an ester bond include polyester elastomers, examples of an elastomer containing an amide bond include polyamide elastomers, and examples of an elastomer containing a urethane bond include polyurethane elastomers.

Polyester elastomers (TPEE) are thermoplastic elastomers in which the hard segment is a polyester (e.g., polybutylene terephthalate) and the soft segment is a polyether (e.g., polytetramethylene glycol) or a polyester (e.g., aliphatic polyester). Polyester elastomers are commercially available, and a commercially available product can be used in the present technology. Examples of commercially available polyester elastomers include PELPRENE® manufactured by Toyobo Co., Ltd. and HYTREL® manufactured by DuPont-Toray Co., Ltd.

Polyamide elastomers (TPA) are thermoplastic elastomers in which the hard segment is a polyamide (e.g., nylon 6, nylon 66, nylon 11, or nylon 12) and the soft segment is a polyether (e.g., polyethylene glycol or polypropylene glycol). Polyamide elastomers are commercially available, and a commercially available product can be used in the present technology. Examples of commercially available polyamide elastomers include UBESTA® XPA Series manufactured by Ube Industries, Ltd. and PEBAX® manufactured by Arkema K. K.

Polyurethane elastomers are block copolymers each composed of a urethane bond-containing hard segment and a soft segment such as a polyether, a polyester, or a polycarbonate. Polyurethane elastomers are commercially available, and a commercially available product can be used in the present technology. Examples of commercially available polyurethane elastomers include ELASTOLLAN® manufactured by BASF SE, MIRACTRAN® manufactured by Nippon Miractran Co., Ltd. and RESAMINE® manufactured by Dainichiseika Color & Chemicals Mfg. Co., Ltd.

The outer layer may also comprise components other than the thermoplastic elastomer within a range that does not hinder the effects of the present technology.

The thickness of the outer layer is preferably 0.2 to 1.2 mm, more preferably 0.3 to 1.0 mm, still more preferably 0.4 to 0.8 mm. When the outer layer is excessively thin, the outer layer is likely to be broken due to abrasion, deformation, impact, or the like during the handling of the hose, and thus has a risk of not being able to sufficiently protect the reinforcing layer, while when the outer layer is excessively thick, an increase in the weight of the hose leads to deterioration in the ease of handling.

A method of producing the hydrogen-filling hose is not particularly limited, and the hydrogen-filling hose can be produced in the following manner First, the inner layer (inner tube) is extruded in the form of a tube by extrusion molding, and fibers constituting the reinforcing layer are subsequently braided on the tube, after which the outer layer (outer tube) is further applied onto the fibers by extrusion molding, whereby the hydrogen-filling hose can be produced.

In the hydrogen-filling hose according to the present technology, the inner layer comprises a thermoplastic resin composition that comprises a matrix comprising a polyamide resin and a domain comprising a modified styrene-based elastomer, the reinforcing layer comprises steel wires, and the outer layer comprises a thermoplastic elastomer. As compared to a polyamide resin, the thermoplastic resin composition that comprises a matrix comprising a polyamide resin and a domain comprising a modified styrene-based elastomer has inferior gas barrier properties and is more likely to allow hydrogen to permeate therethrough; therefore, when the outer layer is formed of a polyamide resin, a trace amount of hydrogen leaking from the inside is unlikely to permeate to the outside, and corrosion of the steel wires with hydrogen is thus likely to occur (the durability is likely to be deteriorated). In the hydrogen-filling hose according to the present technology, since the outer layer is formed of a thermoplastic elastomer, hydrogen leaking from the inside is immediately dissolved in the thermoplastic elastomer and allowed to permeate to the outside of the system, so that hydrogen embrittlement of the steel wires is unlikely to occur. In addition, it was discovered that, as compared to the resin composition disclosed in Patent Literature 1 which comprises polyamide 11 and a modified olefin-based elastomer, the thermoplastic resin composition constituting the inner layer of the present technology, which comprises a matrix comprising a polyamide resin and a domain comprising a modified styrene-based elastomer, has slightly inferior gas barrier properties and is thus more likely to allow hydrogen to permeate therethrough; therefore, although hydrogen embrittlement of the steel wires is likely to occur when the outer layer is formed of a polyamide resin, deterioration in the durability of the steel wires can be inhibited by forming the outer layer from a thermoplastic elastomer.

EXAMPLES

[Raw Materials]

Raw materials used in the below-described Examples and Comparative Examples are as follows.

(Thermoplastic Resins for Inner Layer)

PA11: polyamide 11, RILSAN® BESNO TL manufactured by Arkema K. K.

PA12: polyamide 12, UBESTA® 3020U manufactured by Ube Industries, Ltd.

PA6/66: polyamide 6/66 copolymer, UBE NYLON® 5023B manufactured by Ube Industries, Ltd.

PA610: polyamide 610, AMMAN® CM2001 manufactured by Toray Industries, Inc.

PA6/12: polyamide 6/12 copolymer, UBE NYLON® 7024B manufactured by Ube Industries, Ltd.

PA1010: polyamide 1010, VESTAMID® DS16 manufactured by Daicel-Evonik Ltd.

EVOH: ethylene-vinyl alcohol copolymer, SoarnoL® H4815B, manufactured by Mitsubishi Chemical Corporation (Modified Elastomers for Inner Layer)

Acid-modified EBR (Emulsion Butadiene Rubber): maleic anhydride-modified ethylene-1-butene copolymer, TAFMER® MH7010 manufactured by Mitsui Chemicals, Inc.

Acid-modified SEBS-1: maleic anhydride-modified styrene-ethylene-butylene-styrene block copolymer, TUFTEC® M1943 manufactured by Asahi Kasei Corporation Acid-modified SEBS-2: maleic anhydride-modified styrene-ethylene-butylene-styrene block copolymer, TUFTEC® M1911 manufactured by Asahi Kasei Corporation Acid-modified SBS: maleic anhydride-modified styrene-butadiene-styrene block copolymer, TUFPRENE® 912 manufactured by Asahi Kasei Corporation Amine-modified SEBS: amine-modified styrene-ethylene-butylene-styrene block copolymer, TUFTEC® MP10 manufactured by Asahi Kasei Corporation Epoxy-modified SBS: epoxy-modified styrene-butadiene-styrene block copolymer, EPOFRIEND® AT501 manufactured by DAICEL Corporation (Materials for Reinforcing Layer)

Steel wires: steel wires having a diameter of 0.35 mm

PBO fibers: poly(p-phenylene benzobisoxazole) fibers having a diameter of 0.28 mm (Materials for Outer Layer)

TPEE-1: polyester elastomer, HYTREL® 3046 manufactured by DuPont-Toray Co., Ltd. and having a Tg of −69° C.

TPEE-2: polyester elastomer, HYTREL® 4057N manufactured by DuPont-Toray Co., Ltd. and having a Tg of −26° C.

TPEE-3: polyester elastomer, HYTREL® SB754 manufactured by DuPont-Toray Co., Ltd. and having a Tg of −10° C.

TPEE-4: polyester elastomer, HYTREL® 4047N ( ) manufactured by DuPont-Toray Co., Ltd. and having a Tg of −42° C.

TPA: polyamide elastomer, UBESTA® XPA 9040X1 manufactured by Ube Industries, Ltd. and having a Tg of −62° C.

TPU: polyurethane elastomer, MIRACTRAN® E180 manufactured by Nippon Miractran Co., Ltd. and having a Tg of −45° C.

PA12: nylon 12, UBESTA® 3020U manufactured by Ube Industries, Ltd. and having a Tg of 37° C.

(1) Preparation of Thermoplastic Resin Composition

To a twin-screw kneading extruder manufactured by The Japan Steel Works, Ltd. and having a cylinder temperature set at 220° C., the respective thermoplastic resins and modified elastomers for inner layer shown in Tables 1 to 3 were introduced at the respective blending ratios shown in Tables 1 to 3, and they were melt-kneaded at a retention time of about 5 minutes, after which the resulting melt-kneaded product was extruded in the form of a strand from a die attached to the discharge port. The thus obtained strand-form extruded material was pelletized using a resin pelletizer to prepare a pellet-form thermoplastic resin composition (inner layer material).

(2) Measurement of Change in Volume of Inner Layer Material Due to Hydrogen Exposure The pellet-form thermoplastic resin composition prepared by the above procedure (1) was molded into a sheet having an average thickness of 1.0 mm using a 40-mmφ uniaxial extruder manufactured by Pla Giken Co., Ltd. and equipped with a 200 mm-wide T-die under the conditions where the cylinder temperature and the die temperature were set at 20° C. higher than the melting point of a material having the highest melting point in the composition, the cooling roll temperature was 50° C., and the take-up speed was 1 m/min. This sheet was cut out in a disk shape of 13 mm in diameter, placed in a pressure-resistant vessel, and exposed to hydrogen at 30° C. and 90 MPa for 24 hours. The pressure was subsequently reduced to the atmospheric pressure and, immediately thereafter, the area of the disk-shaped sample was measured using a two-dimensional multi-point dimensional measurement device TM-3000 manufactured by Keyence Corporation, and the change in volume was calculated. The volume decreased with desorption of hydrogen and, in this process, a value obtained by dividing the largest volume (maximum value) by the pre-exposure volume measured in the same manner was defined as the rate of the change. When the rate of the change is 1.08 or higher, repeated transport of hydrogen through a hose causes the inner layer to encroach into the reinforcing layer due to the change in volume, as a result of which the durability is deteriorated. The rate of the change is shown in Tables 1 to 3.

(3) Measurement of Amount of Hydrogen Dissolved in Inner Layer Material Due to Hydrogen Exposure In the same manner as in (2), 24-hour hydrogen exposure was performed at 30° C. and 90 MPa, and the pressure was subsequently reduced to the atmospheric pressure Immediately thereafter, the disk-shaped sample was left to stand in a tube filled with nitrogen at 30° C., and the gas inside the tube was introduced to a gas chromatography apparatus from an end of the tube at certain time intervals. Hydrogen desorbed from the inside of the sample was detected, and the measurement was continued until hydrogen was no longer detected, after which the cumulative amount of detected hydrogen was calculated to determine the amount of hydrogen dissolved in the sample due to the exposure. The amount of dissolved hydrogen is shown in Tables 1 to 3.

(4) Measurement of Fatigue Resistance of Inner Layer Material at Low Temperature From a sheet that was extrusion-molded in the same manner as in (2), 20 strips of 5 mm in width and 200 mm in length were cut out and, using a constant stress/strain fatigue tester manufactured by Ueshima Seisakusho Co., Ltd., these strips were subjected to repeated stretching deformation under the conditions of a temperature of −35° C., a strain of 13.5%, and a speed of 100 rpm. The number of cycles at which 12 of the 20 strips (60%) were broken was defined as "number of cycles at break". A greater number of cycles at break is more advantageous and more preferred against repeated deformation at a low temperature, and the number of cycles at break was evaluated to be "not acceptable" when it was less than 2,000,000, "good" when it was 2,000,000 or more but less than 5,000,000, or "excellent" when it was 5,000,000 or more. The evaluation results are shown in Tables 1 to 3.

(5) Measurement of Hydrogen Permeability Coefficient of Inner Layer Material

The pellet-form thermoplastic resin composition prepared by the above procedure (1) was molded into a film having an average thickness of 0.2 mm using a 40-mmφ uniaxial extruder manufactured by Pla Giken Co., Ltd. and equipped with a 550 mm-wide T-die under the conditions where the cylinder temperature and the die temperature were set at 20° C. higher than the melting point of a material having the highest melting point in the composition, the cooling roll temperature was 50° C., and the take-up speed was 3 m/min. This film was cut out such that a circle of 22 mm in diameter constituted a permeation surface, and hydrogen gas was circulated under the conditions of 30° C., 0% RH, and 0.5 MPa using a gas permeation tester manufactured by GTR TEC Corporation. The hydrogen gas permeating through the film was detected by gas chromatography, and the hydrogen permeability coefficient was determined by a calibration curve method. The measurement results are shown in Tables 1 to 3.

(6) Evaluation of Hydrogen Embrittlement of Steel Wires

Simulating a laminated structure of a hose, the thermoplastic resin film obtained in the above (5) was selected for an inner layer, and PBO fibers and steel wires, or steel wires selected for a reinforcing layer were arranged on the thermoplastic resin film. A 0.5 mm-thick thermoplastic elastomer sheet selected for an outer layer was further laminated thereon, and an adhesive was applied between these layers and then dried, after which the layers were press-bonded at 90° C. and 1 MPa, whereby a flat laminate was obtained. In this process, the PBO fibers and the steel wires were disposed parallel to one another in the longitudinal direction at 3-mm intervals to form a single layer, and this layer was superimposed on one another such that the longitudinal direction was perpendicular between the upper and the lower layers. For Examples 1 to 16 and Comparative Examples 1 to 5, the PBO fibers were arranged in three layers and the steel wires were arranged thereon in a single layer, while the steel wires were arranged in four layers for Examples 17 and 18 and Comparative Example 6. These laminates were each cut out in a prescribed size and arranged in a pressure vessel in such manner to partition the pressure vessel into two spaces, and the space on the outer layer side was subsequently vacuumed and hydrogen was supplied from the inner layer side at a pressure of 10 MPa for 15 minutes, after which nitrogen was supplied, and the supply of hydrogen and that of nitrogen were alternately repeated 2,000 times. Thereafter, the laminate was taken out of the vessel and only the steel wires were peeled off, followed by a tensile test that was conducted to measure the breaking strength. The strength of the steel wires of Comparative Example 1 where PA12 was arranged as the outer layer was taken as 100, and a breaking strength value of 103 or more was deemed to indicate the presence of an effect of inhibiting embrittlement of the steel wires, while a value of less than 97 was deemed to indicate a tendency of worsening the embrittlement, and a value of 97 or more but less than 103 was deemed to indicate the absence of the effect. The evaluation results are shown in Tables 1 to 3.

TABLE 1

| | | | | Comparative Example 1 | Comparative Example 2 | Comparative Example 3 |
|---|---|---|---|---|---|---|
| Inner layer | Thermoplastic resin | PA11 | parts by weight | 70 | 70 | 70 |
| | | PA12 | parts by weight | | | |
| | | PA6/66 | parts by weight | | | |
| | | PA610 | parts by weight | | | |
| | | PA6/12 | parts by weight | | | |
| | | PA1010 | parts by weight | | | |
| | | EVOH | parts by weight | | | |
| | Modified elastomer | acid-modified EBR | parts by weight | | 30 | 30 |
| | | acid-modified SEBS-1 | parts by weight | 30 | | |
| | | acid-modified SEBS-2 | parts by weight | | | |
| | | acid-modified SBS | parts by weight | | | |
| | | amine-modified SEBS | parts by weight | | | |
| | | epoxy-modified SBS | parts by weight | | | |
| Reinforcing layer | | | | 3 layers formed of PBO fibers + 1 layer formed of steel wires | | |
| Outer layer | | | | PA12 | PA12 | TPEE-1 |
| Rate of change in volume of inner layer material due to hydrogen exposure | | | | 1.04 | 1.09 | 1.09 |
| Amount of hydrogen dissolved in inner layer material due to hydrogen exposure/ppm by weight | | | | 2,030 | 2,240 | 2,240 |
| Number of cycles at break in low-temperature constant strain fatigue test of inner layer material/1,000 cycles | | | | good | good | good |
| Hydrogen permeability coefficient of inner layer material/$10^{-10}$ cc · cm/(cm$^2$ · s · cmHg) | | | | 2.4 | 2.0 | 2.0 |
| Strength of steel wires after hydrogen permeation in evaluation of hydrogen embrittlement of steel wires | | | | 100 | 100 | 107 |

| | | | | Example 1 | Example 2 | Example 3 |
|---|---|---|---|---|---|---|
| Inner layer | Thermoplastic resin | PA11 | parts by weight | 70 | 70 | 70 |
| | | PA12 | parts by weight | | | |
| | | PA6/66 | parts by weight | | | |
| | | PA610 | parts by weight | | | |
| | | PA6/12 | parts by weight | | | |

TABLE 1-continued

| | | | | | | |
|---|---|---|---|---|---|---|
| | | PA1010 | parts by weight | | | |
| | | EVOH | parts by weight | | | |
| | Modified elastomer | acid-modified EBR | parts by weight | | | |
| | | acid-modified SEBS-1 | parts by weight | 30 | 30 | 30 |
| | | acid-modified SEBS-2 | parts by weight | | | |
| | | acid-modified SBS | parts by weight | | | |
| | | amine-modified SEBS | parts by weight | | | |
| | | epoxy-modified SBS | parts by weight | | | |
| Reinforcing layer | | | | 3 layers formed of PBO fibers + 1 layer formed of steel wires | | |
| Outer layer | | | | TPEE-1 | TPEE-2 | TPEE-3 |
| Rate of change in volume of inner layer material due to hydrogen exposure | | | | 1.04 | 1.04 | 1.04 |
| Amount of hydrogen dissolved in inner layer material due to hydrogen exposure/ppm by weight | | | | 2,030 | 2,030 | 2,030 |
| Number of cycles at break in low-temperature constant strain fatigue test of inner layer material/1,000 cycles | | | | good | good | good |
| Hydrogen permeability coefficient of inner layer material/$10^{-10}$ cc · cm/(cm$^2$ · s · cmHg) | | | | 2.4 | 2.4 | 2.4 |
| Strength of steel wires after hydrogen permeation in evaluation of hydrogen embrittlement of steel wires | | | | 107 | 106 | 105 |

| | | | | Example 4 | Example 5 | Example 6 |
|---|---|---|---|---|---|---|
| Inner layer | Thermoplastic resin | PA11 | parts by weight | 70 | 70 | 85 |
| | | PA12 | parts by weight | | | |
| | | PA6/66 | parts by weight | | | |
| | | PA610 | parts by weight | | | |
| | | PA6/12 | parts by weight | | | |
| | | PA1010 | parts by weight | | | |
| | | EVOH | parts by weight | | | |
| | Modified elastomer | acid-modified EBR | parts by weight | | | |
| | | acid-modified SEBS-1 | parts by weight | 30 | 30 | 15 |
| | | acid-modified SEBS-2 | parts by weight | | | |
| | | acid-modified SBS | parts by weight | | | |
| | | amine-modified SEBS | parts by weight | | | |
| | | epoxy-modified SBS | parts by weight | | | |
| Reinforcing layer | | | | 3 layers formed of PBO fibers + 1 layer formed of steel wires | | |
| Outer layer | | | | TPA | TPU | TPEE-1 |
| Rate of change in volume of inner layer material due to hydrogen exposure | | | | 1.04 | 1.04 | 1.02 |
| Amount of hydrogen dissolved in inner layer material due to hydrogen exposure/ppm by weight | | | | 2,030 | 2,030 | 1,780 |
| Number of cycles at break in low-temperature constant strain fatigue test of inner layer material/1,000 cycles | | | | good | good | good |
| Hydrogen permeability coefficient of inner layer material/$10^{-10}$ cc · cm/(cm$^2$ · s · cmHg) | | | | 2.4 | 2.4 | 1.5 |
| Strength of steel wires after hydrogen permeation in evaluation of hydrogen embrittlement of steel wires | | | | 105 | 105 | 108 |

TABLE 2

| | | | | Comparative Example 4 | Example 7 | Comparative Example 5 |
|---|---|---|---|---|---|---|
| Inner layer | Thermoplastic resin | PA11 | parts by weight | 98 | 50 | 40 |
| | | PA12 | parts by weight | | | |
| | | PA6/66 | parts by weight | | | |
| | | PA610 | parts by weight | | | |
| | | PA6/12 | parts by weight | | | |
| | | PA1010 | parts by weight | | | |
| | | EVOH | parts by weight | | | |
| | Modified elastomer | acid-modified EBR | parts by weight | | | |
| | | acid-modified SEBS-1 | parts by weight | 2 | 50 | 60 |
| | | acid-modified SEBS-2 | parts by weight | | | |
| | | acid-modified SBS | parts by weight | | | |
| | | amine-modified SEBS | parts by weight | | | |
| | | epoxy-modified SBS | parts by weight | | | |
| Reinforcing layer | | | | 3 layers formed of PBO fibers + 1 layer formed of steel wires | | |
| Outer layer | | | | TPEE-1 | TPEE-1 | TPEE-1 |
| Rate of change in volume of inner layer material due to hydrogen exposure | | | | 1.01 | 1.07 | 1.12 |
| Amount of hydrogen dissolved in inner layer material due to hydrogen exposure/ppm by weight | | | | 1,680 | 2,490 | 2,710 |

TABLE 2-continued

|  |  |  |  |  |  |
|---|---|---|---|---|---|
| Number of cycles at break in low-temperature constant strain fatigue test of inner layer material/1,000 cycles | | | not acceptable | excellent | excellent |
| Hydrogen permeability coefficient of inner layer material/$10^{-10}$ cc · cm/ (cm$^2$ · s · cmHg) | | | 0.8 | 5.1 | 13.3 |
| Strength of steel wires after hydrogen permeation in evaluation of hydrogen embrittlement of steel wires | | | 109 | 104 | 99 |

|  |  |  |  | Example 8 | Example 9 | Example 10 |
|---|---|---|---|---|---|---|
| Inner layer | Thermoplastic resin | PA11 | parts by weight | 70 | 70 | |
| | | PA12 | parts by weight | | | 70 |
| | | PA6/66 | parts by weight | | | |
| | | PA610 | parts by weight | | | |
| | | PA6/12 | parts by weight | | | |
| | | PA1010 | parts by weight | | | |
| | | EVOH | parts by weight | | | |
| | Modified elastomer | acid-modified EBR | parts by weight | | | |
| | | acid-modified SEBS-1 | parts by weight | | | 30 |
| | | acid-modified SEBS-2 | parts by weight | 30 | | |
| | | acid-modified SBS | parts by weight | | 30 | |
| | | amine-modified SEBS | parts by weight | | | |
| | | epoxy-modified SBS | parts by weight | | | |
| Reinforcing layer | | | | colspan: 3 layers formed of PBO fibers + 1 layer formed of steel wires | | |
| Outer layer | | | | TPEE-1 | TPEE-2 | TPEE-4 |
| Rate of change in volume of inner layer material due to hydrogen exposure | | | | 1.04 | 1.05 | 1.04 |
| Amount of hydrogen dissolved in inner layer material due to hydrogen exposure/ppm by weight | | | | 2,010 | 2,090 | 2,110 |
| Number of cycles at break in low-temperature constant strain fatigue test of inner layer material/1,000 cycles | | | | good | good | good |
| Hydrogen permeability coefficient of inner layer material/$10^{-10}$ cc · cm/ (cm$^2$ · s · cmHg) | | | | 2.5 | 2.5 | 2.7 |
| Strength of steel wires after hydrogen permeation in evaluation of hydrogen embrittlement of steel wires | | | | 106 | 106 | 106 |

|  |  |  |  | Example 11 | Example 12 |
|---|---|---|---|---|---|
| Inner layer | Thermoplastic resin | PA11 | parts by weight | | |
| | | PA12 | parts by weight | | |
| | | PA6/66 | parts by weight | 50 | |
| | | PA610 | parts by weight | | 60 |
| | | PA6/12 | parts by weight | | |
| | | PA1010 | parts by weight | | |
| | | EVOH | parts by weight | | |
| | Modified elastomer | acid-modified EBR | parts by weight | | |
| | | acid-modified SEBS-1 | parts by weight | 50 | 40 |
| | | acid-modified SEBS-2 | parts by weight | | |
| | | acid-modified SBS | parts by weight | | |
| | | amine-modified SEBS | parts by weight | | |
| | | epoxy-modified SBS | parts by weight | | |
| Reinforcing layer | | | | 3 layers formed of PBO fibers + 1 layer formed of steel wires | |
| Outer layer | | | | TPEE-4 | TPEE-4 |
| Rate of change in volume of inner layer material due to hydrogen exposure | | | | 1.06 | 1.04 |
| Amount of hydrogen dissolved in inner layer material due to hydrogen exposure/ppm by weight | | | | 1,850 | 1,800 |
| Number of cycles at break in low-temperature constant strain fatigue test of inner layer material/1,000 cycles | | | | good | good |
| Hydrogen permeability coefficient of inner layer material/$10^{-10}$ cc · cm/ (cm$^2$ · s · cmHg) | | | | 0.4 | 1.7 |
| Strength of steel wires after hydrogen permeation in evaluation of hydrogen embrittlement of steel wires | | | | 111 | 107 |

TABLE 3

|  |  |  |  | Example 13 | Example 14 | Comparative Example 6 |
|---|---|---|---|---|---|---|
| Inner layer | Thermoplastic resin | PA11 | parts by weight | | | |
| | | PA12 | parts by weight | | | |
| | | PA6/66 | parts by weight | | | |
| | | PA610 | parts by weight | | | |
| | | PA6/12 | parts by weight | 60 | | |
| | | PA1010 | parts by weight | | 70 | |
| | | EVOH | parts by weight | | | 70 |

TABLE 3-continued

|  |  |  |  |  |  |  |
|---|---|---|---|---|---|---|
| | Modified elastomer | acid-modified EBR | parts by weight | | | |
| | | acid-modified SEBS-1 | parts by weight | 40 | 30 | 30 |
| | | acid-modified SEBS-2 | parts by weight | | | |
| | | acid-modified SBS | parts by weight | | | |
| | | amine-modified SEBS | parts by weight | | | |
| | | epoxy-modified SBS | parts by weight | | | |
| Reinforcing layer | | | | \multicolumn{3}{c}{3 layers formed of PBO fibers + 1 layer formed of steel wires} |
| Outer layer | | | | TPEE-4 | TPEE-4 | TPEE-4 |
| Rate of change in volume of inner layer material due to hydrogen exposure | | | | 1.04 | 1.04 | 1.07 |
| Amount of hydrogen dissolved in inner layer material due to hydrogen exposure/ppm by weight | | | | 1,780 | 2,080 | 880 |
| Number of cycles at break in low-temperature constant strain fatigue test of inner layer material/1,000 cycles | | | | good | good | Not acceptable |
| Hydrogen permeability coefficient of inner layer material/$10^{-10}$ cc · cm/(cm$^2$ · s · cmHg) | | | | 1.5 | 2.5 | 0.02 |
| Strength of steel wires after hydrogen permeation in evaluation of hydrogen embrittlement of steel wires | | | | 108 | 106 | 92 |

|  |  |  |  | Example 15 | Example 16 |
|---|---|---|---|---|---|
| Inner layer | Thermoplastic resin | PA11 | parts by weight | 70 | 70 |
| | | PA12 | parts by weight | | |
| | | PA6/66 | parts by weight | | |
| | | PA610 | parts by weight | | |
| | | PA6/12 | parts by weight | | |
| | | PA1010 | parts by weight | | |
| | | EVOH | parts by weight | | |
| | Modified elastomer | acid-modified EBR | parts by weight | | |
| | | acid-modified SEBS-1 | parts by weight | | |
| | | acid-modified SEBS-2 | parts by weight | | |
| | | acid-modified SBS | parts by weight | | |
| | | amine-modified SEBS | parts by weight | 30 | |
| | | epoxy-modified SBS | parts by weight | | 30 |
| Reinforcing layer | | | | \multicolumn{2}{c}{3 layers formed of PBO fibers + 1 layer formed of steel wires} |
| Outer layer | | | | TPEE-2 | TPEE-2 |
| Rate of change in volume of inner layer material due to hydrogen exposure | | | | 1.05 | 1.05 |
| Amount of hydrogen dissolved in inner layer material due to hydrogen exposure/ppm by weight | | | | 2,150 | 2,170 |
| Number of cycles at break in low-temperature constant strain fatigue test of inner layer material/1,000 cycles | | | | good | good |
| Hydrogen permeability coefficient of inner layer material/$10^{-10}$ cc · cm/(cm$^2$ · s · cmHg) | | | | 2.6 | 2.7 |
| Strength of steel wires after hydrogen permeation in evaluation of hydrogen embrittlement of steel wires | | | | 106 | 106 |

|  |  |  |  | Example 17 | Example 18 | Comparative Example 7 |
|---|---|---|---|---|---|---|
| Inner layer | Thermoplastic resin | PA11 | parts by weight | 70 | 70 | 70 |
| | | PA12 | parts by weight | | | |
| | | PA6/66 | parts by weight | | | |
| | | PA610 | parts by weight | | | |
| | | PA6/12 | parts by weight | | | |
| | | PA1010 | parts by weight | | | |
| | | EVOH | parts by weight | | | |
| | Modified elastomer | acid-modified EBR | parts by weight | | | 30 |
| | | acid-modified SEBS-1 | parts by weight | 30 | | |
| | | acid-modified SEBS-2 | parts by weight | | 30 | |
| | | acid-modified SBS | parts by weight | | | |
| | | amine-modified SEBS | parts by weight | | | |
| | | epoxy-modified SBS | parts by weight | | | |
| Reinforcing layer | | | | \multicolumn{3}{c}{4 layers formed of steel wires} |
| Outer layer | | | | TPEE-2 | TPEE-1 | PA12 |
| Rate of change in volume of inner layer material due to hydrogen exposure | | | | 1.04 | 1.04 | 1.09 |
| Amount of hydrogen dissolved in inner layer material due to hydrogen exposure/ppm by weight | | | | 2,030 | 2,010 | 2,240 |
| Number of cycles at break in low-temperature constant strain fatigue test of inner layer material/1,000 cycles | | | | good | good | good |
| Hydrogen permeability coefficient of inner layer material/$10^{-10}$ cc · cm/(cm$^2$ · s · cmHg) | | | | 2.4 | 2.5 | 2.0 |
| Strength of steel wires after hydrogen permeation in evaluation of hydrogen embrittlement of steel wires | | | | 106 | 106 | 99 |

The hydrogen-filling hose according to the present technology can be suitably utilized as a hose through which hydrogen gas is filled into a fuel cell vehicle or the like from a dispenser installed at a hydrogen station.

The invention claimed is:

1. A hydrogen-filling hose, comprising an inner layer, a reinforcing layer, and an outer layer, wherein the inner layer comprises a thermoplastic resin composition that comprises a matrix comprising a polyamide resin and a domain comprising a modified styrene-based elastomer, the content of the modified styrene-based elastomer in the thermoplastic resin composition is 5 to 50% by weight of all polymer components in the thermoplastic resin composition, the reinforcing layer comprises at least one layer comprising steel wires, the outer layer comprises a thermoplastic elastomer, the thermoplastic elastomer comprising a polyamide elastomer, and a ratio $V/V_0$ of a volume V, which is a volume of the thermoplastic resin composition measured after the thermoplastic resin composition is exposed to a hydrogen atmosphere having a temperature of 30° C. and a pressure of 90 MPa for 24 hours and subsequently the pressure is reduced to the atmospheric pressure, to a volume $V_0$, which is a volume of the thermoplastic resin composition measured prior to the exposure, is lower than 1.08.

2. The hydrogen-filling hose according to claim 1, wherein the polyamide resin is polyamide 11, polyamide 12, polyamide 6/66 copolymer, polyamide 610, polyamide 6/12 copolymer, polyamide 1010, or polyamide 1012.

3. The hydrogen-filling hose according to claim 1, wherein the amount of dissolved hydrogen is 3,000 ppm by weight or less after the 24-hour exposure of the thermoplastic resin composition to a hydrogen atmosphere having a temperature of 30° C. and a pressure of 90 MPa.

4. The hydrogen-filling hose according to claim 1, wherein, when strain is repeatedly applied to the thermoplastic resin composition at a temperature of −35° C., an amplitude of 13.5%, and a frequency of 1.7 Hz, the number of cycles at break is not less than 2,000,000.

5. The hydrogen-filling hose according to claim 1, wherein the thermoplastic resin composition has a hydrogen permeability coefficient of $12 \times 10^{-10}$ cc·cm/(cm²·s·cmHg) or less.

6. The hydrogen-filling hose according to claim 1, wherein the reinforcing layer comprises a layer comprising poly(p-phenylene benzobisoxazole) fibers.

7. The hydrogen-filling hose according to claim 1, wherein the modified styrene-based elastomer is an acid-modified, amine-modified, or epoxy-modified styrene-butadiene-styrene block copolymer (SBS), styrene-ethylene-butylene-styrene block copolymer (SEBS), styrene-isoprene-styrene block copolymer (SIS), styrene-ethylene-propylene block copolymer (SEP), or styrene-ethylene-propylene-styrene block copolymer (SEPS).

8. The hydrogen-filling hose according to claim 7, wherein the polyamide resin is polyamide 11, polyamide 12, polyamide 6/66 copolymer, polyamide 610, polyamide 6/12 copolymer, polyamide 1010, or polyamide 1012.

9. The hydrogen-filling hose according to claim 8, wherein the amount of dissolved hydrogen is 3,000 ppm by weight or less after the 24-hour exposure of the thermoplastic resin composition to a hydrogen atmosphere having a temperature of 30° C. and a pressure of 90 MPa.

10. The hydrogen-filling hose according to claim 9, wherein, when strain is repeatedly applied to the thermoplastic resin composition at a temperature of −35° C., an amplitude of 13.5%, and a frequency of 1.7 Hz, the number of cycles at break is not less than 2,000,000.

11. The hydrogen-filling hose according to claim 10, wherein the thermoplastic resin composition has a hydrogen permeability coefficient of $12 \times 10^{-10}$ cc·cm/(cm²·s·cmHg) or less.

12. The hydrogen-filling hose according to claim 11, wherein the reinforcing layer comprises a layer comprising poly(p-phenylene benzobisoxazole) fibers.

* * * * *